United States Patent
Mritunjai et al.

(10) Patent No.: US 12,380,083 B1
(45) Date of Patent: Aug. 5, 2025

(54) INDEXING SUB-TABLES FOR PERFORMANT ACCESS REQUESTS

(71) Applicant: Amazon Technologies, Inc., Seattle, WA (US)

(72) Inventors: Akhilesh Mritunjai, Seattle, WA (US); Cameron Ryan Alberts, Seattle, WA (US); Yosseff Levanoni, Redmond, WA (US); Vivek Srivastava, Bellevue, WA (US); Dolev Ish am, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 16/835,044

(22) Filed: Mar. 30, 2020

(51) Int. Cl.
*G06F 16/22* (2019.01)
*G06F 16/21* (2019.01)
*G06F 16/27* (2019.01)

(52) U.S. Cl.
CPC ........ *G06F 16/2282* (2019.01); *G06F 16/211* (2019.01); *G06F 16/2272* (2019.01); *G06F 16/27* (2019.01); *G06F 16/278* (2019.01)

(58) Field of Classification Search
CPC .................................................. G06F 16/278
See application file for complete search history.

(56) References Cited

U.S. PATENT DOCUMENTS

| | | | |
|---|---|---|---|
| 6,801,903 B2 | 10/2004 | Brown et al. | |
| 7,155,428 B1 | 12/2006 | Brown et al. | |
| 7,499,907 B2 | 3/2009 | Brown et al. | |
| 2006/0253473 A1* | 11/2006 | Agrawal | G06F 16/278 |
| 2010/0235348 A1* | 9/2010 | Baby | G06F 16/81 707/715 |
| 2014/0344236 A1* | 11/2014 | Xiao | G06F 16/2358 707/696 |
| 2015/0317340 A1* | 11/2015 | Sardina | G06F 16/22 707/803 |
| 2015/0331927 A1* | 11/2015 | Venkatesan | G06F 16/278 707/810 |
| 2016/0078089 A1* | 3/2016 | Hu | G06F 16/2379 707/714 |
| 2016/0335302 A1* | 11/2016 | Teodorescu | G06F 16/22 |
| 2017/0109386 A1* | 4/2017 | Baer | G06F 16/24554 |
| 2017/0249087 A1* | 8/2017 | Shekhar | G06F 16/00 |
| 2018/0089183 A1* | 3/2018 | Schwartz | G06F 16/41 |
| 2019/0392047 A1* | 12/2019 | Sorenson, III | G06F 16/172 |
| 2020/0125666 A1* | 4/2020 | Eadon | G06F 16/278 |
| 2021/0216572 A1* | 7/2021 | Braghin | G06F 16/278 |

OTHER PUBLICATIONS

Amazon DynamoDB Developer Guide, API Version Aug. 10, 2012 (Year: 2012).*

* cited by examiner

*Primary Examiner* — Brittany N Allen
(74) *Attorney, Agent, or Firm* — S. Scott Foster; Kowert, Hood, Munyon, Rankin and Goetzel, P.C.

(57) ABSTRACT

Sub-tables are indexed to implement performant access requests. Sub-tables may be created in a database table. Items may be stored in the table according to an indexing scheme that co-locates items in a same sub-table in an index. Access requests for items in a sub-table may be performed by applying the indexing scheme to locate the items in the sub-table from the index.

20 Claims, 9 Drawing Sheets

US 12,380,083 B1

INDEXING SUB-TABLES FOR PERFORMANT ACCESS REQUESTS

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement indexing sub-tables for performant access requests, according to some embodiments. Many client applications of a database sub-divide a table into different sub-tables that store information for different entities, systems, devices, or other applications. For example, a service application that utilizes a database as a back-end may utilize a customer identifier in table to logically subdivide the table and store items for that customer in the same sub-table within the table while also storing items for other customers in other respective sub-tables for those customer identifiers. In order to be able to both access sub-tables of a table efficiently, as well as the table as a whole, techniques for indexing sub-tables of a table may be implemented.

In various embodiments, performant sub-table indexing techniques may be implemented that preserve the locality of items within a sub-table, unlike other techniques that do not preserve the locality of items within a sub-table. For example, as discussed below, a co-location indexing scheme may be implemented to physically store together sub-table items (or pointers to sub-table items), which improves the performance of access requests (e.g., queries or scans) over other techniques for implementing sub-tables, like techniques that prepend a sub-table-id to the hash-key of an item (as such prepending techniques do not maintain the items of the same sub-table in similar physical storage locations, and thus cause more costly read operations to locate the items of a sub-table when performing an access request). Moreover, performant sub-table indexing techniques can offer additional features for sub-tables, such as implementing per-sub-table quality-of-service controls and sub-table specific measurement for storage or other sub-table operations (e.g., processing utilization, network utilization, and so on). In various embodiments, creating a sub-table may be performed without creating a new table.

Figure 1:
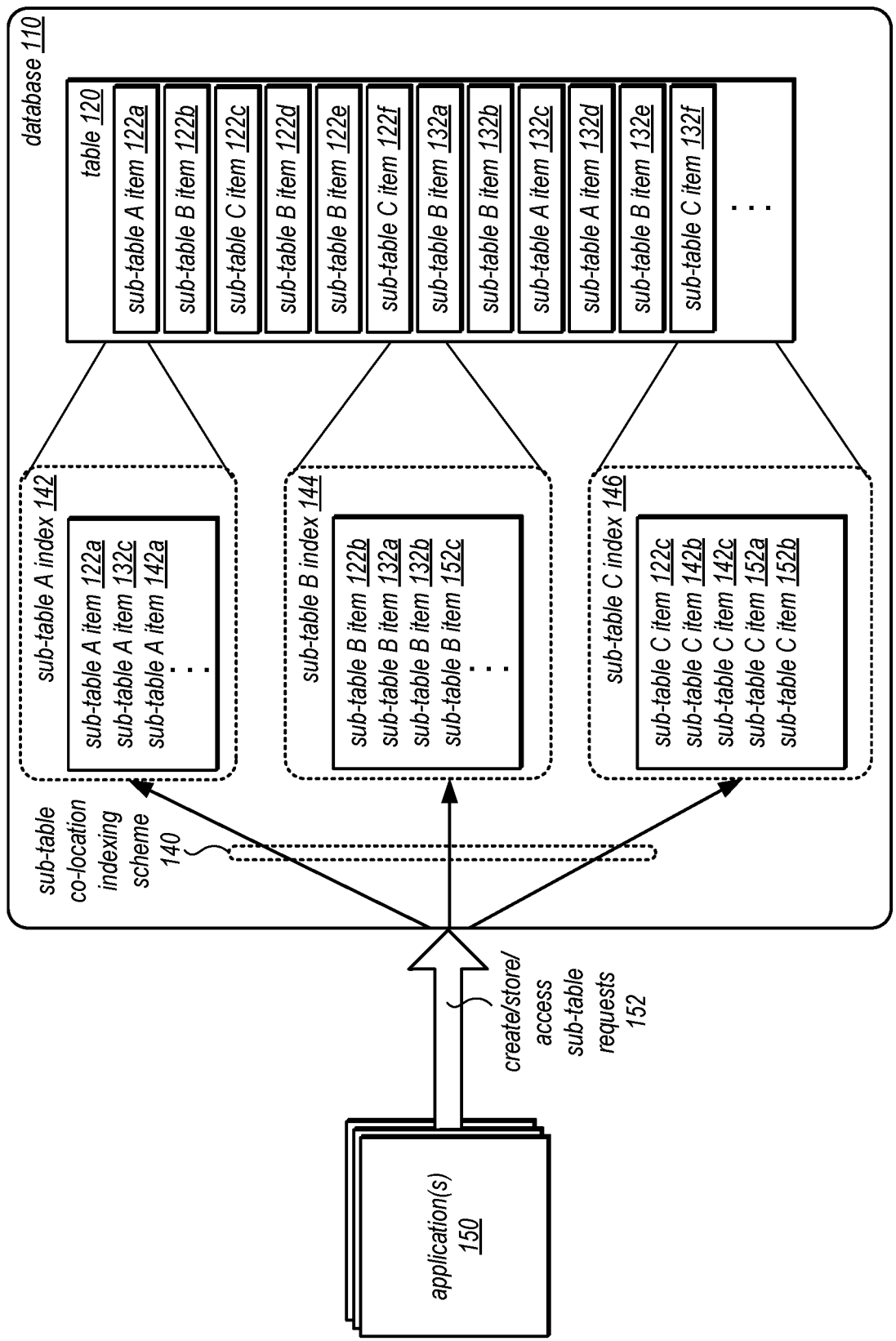
FIG. 1 is a logical block diagram illustrating indexing sub-tables for performant access requests, according to some embodiments.

FIG. 1 is a logical block diagram illustrating indexing sub-tables for performant access requests, according to some embodiments. Database 110 may store collections of data objects (e.g., records, rows, entries, or other items) in different respective tables, in some embodiments. Tables may be non-relational, semi-structured or otherwise organized to not enforce an exact same schema (e.g., same number of attributes) on each item stored as part of the table, in some embodiments. In other embodiments, relational databases or other types of database may structure, relate, or enforce a schema on items in a table.

Indexing sub-tables for performant access requests may be implemented for database 110 to store items for different sub-tables in a same table. For example, in FIG. 1, three different sub-tables, sub-table A, sub-table B, and sub-table C each may have different respective items (e.g., items 122*a*, 132*c*, and 142*a* for sub-table A, items 122*b*, 132*a*, 132*b*, and 152*c* for sub-table B, and items 122*c*, 142*b*, 142*c*, 152*a*, and 152*b* for sub-table C). An indexing scheme 140 may store or otherwise co-locate items in a sub-table an index (e.g., in separate indexes or as part of a single index as discussed below with regard to FIGS. 5A and 5B). For instance, sub-table A index 142 may co-locate and reference the sub-table A items in table 120. Similarly, sub-table B index 144 may co-locate and reference the sub-table B items in table 120 and sub-table C index 146 may co-locate and reference the sub-table C items in table 120.

As discussed in detail below with regard to FIGS. 3 and 4, clients, such as applications 150, can perform various requests to create, store and/or otherwise access items in sub-tables, as indicated at 152 using the sub-table colocation indexing scheme 140. In this way, as noted earlier, the benefits of co-location on query performance may be applicable to access requests directed to items in a sub-table, while supporting other sub-table features, such as automated management features, encryption, replication, backup, restore, among other features, as discussed in detail below.

Please note that previous descriptions of implementing indexing sub-tables for performant access requests are not intended to be limiting, but are merely provided as logical examples. For example, the number, size, type, and arrangement of indexes and tables may be different than those discussed above with regard to FIG. 1

This specification begins with a general description of a provider network that may implement a database service that may implement indexing sub-tables for performant access requests. Then various examples of a database service are discussed, including different components/modules, or arrangements of components/module, that may be employed as part of implementing the database service, in one embodiment. A number of different methods and techniques to implement indexing sub-tables for performant access requests are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
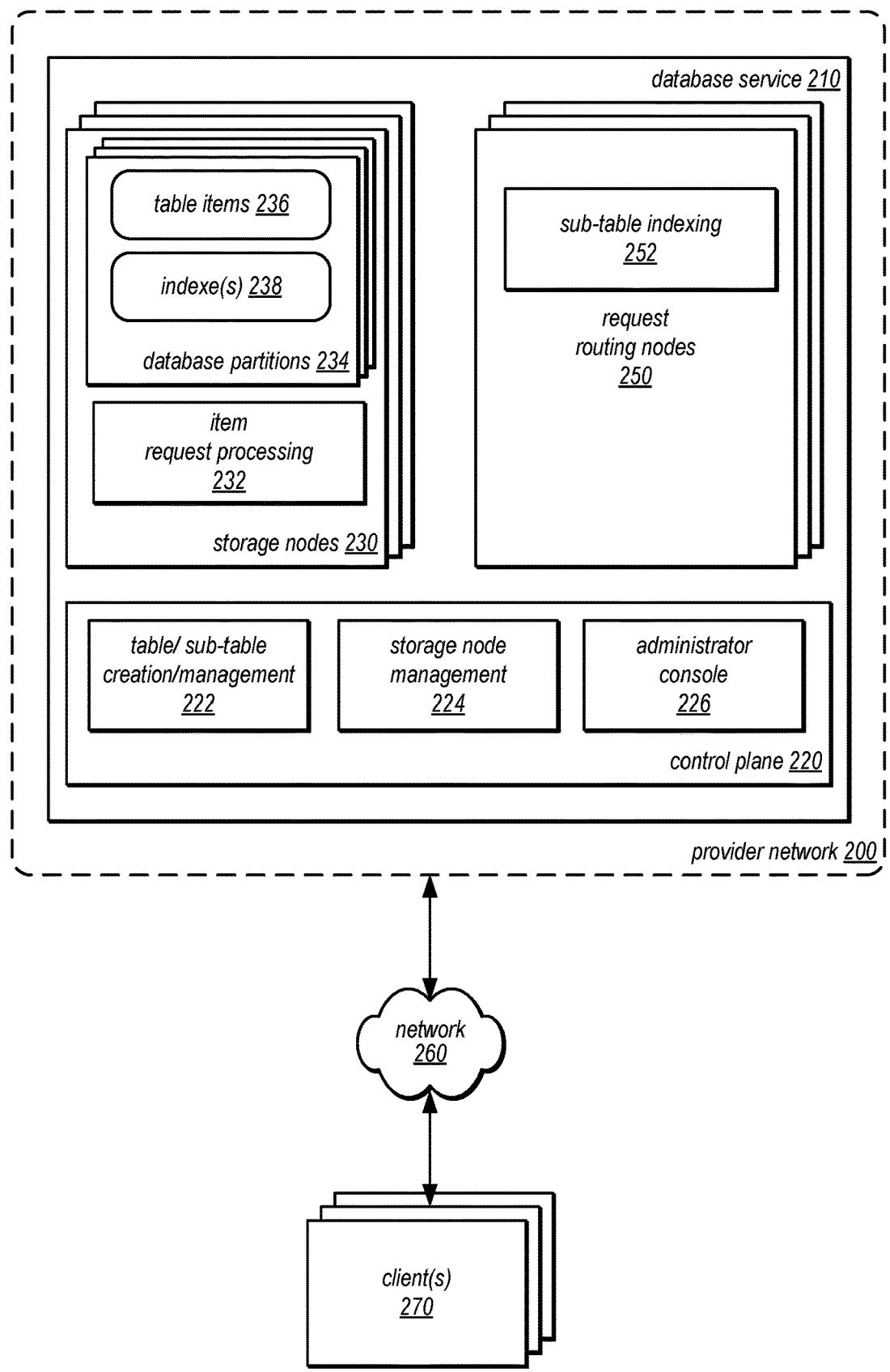
FIG. 2 is a logical block diagram illustrating a provider network offering a database service that may implement indexing sub-tables for performant access requests in a database, according to some embodiments.

FIG. 2 is a logical block diagram illustrating a provider network offering a database service that may implement indexing sub-tables for performant access requests in a database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented as various types of distributed database services, in one embodiment, for storing, accessing, and updating data in tables hosted in key-value database. Such services may be enterprise-class database systems that are highly scalable and extensible. In one embodiment, access requests (e.g., requests to get/obtain items, put/insert items, delete items, update or modify items, query or scan multiple items) may be directed to a table in database service 210 that is distributed across multiple physical resources, and the database system may be scaled up or down on an as needed basis. In one embodiment, clients/subscribers may submit requests in a number of ways, e.g., interactively via graphical user interface (e.g., a console) or a programmatic interface to the database system. In one embodiment, database service 210 may provide a RESTful programmatic interface in order to submit access requests (e.g., to get, insert, delete, or scan data).

In one embodiment, clients 270 may encompass any type of client configurable to submit network-based requests to provider network 200 via network 260, including requests for database service 210 (e.g., to access item(s) in a table in database service 210). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 252700 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In one embodiment, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Database service 210 may implement request routing nodes 250, in one embodiment. Request routing nodes 250 may receive and parse access requests, in various embodiments in order to determine various features of the request, to parse, authenticate, throttle and/or dispatch access requests, among other things, in one embodiment. As discussed in detail below with regard to FIG. 3, request routing nodes 250 may incorporate sub-table indexing 252 to perform various aspects of directing requests for items to the appropriate partitions according to the indexing schemes discussed below with regard to FIGS. 5A-8.

In one embodiment, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in one embodiment. Control plane 220 may provide visibility and control to system administrators via administrator console 226, in some embodiment. Admin console 226 may allow system administrators to interact directly with database service 210 (and/or the underlying system). In one embodiment, the admin console 226 may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in one embodiment.

Storage node management 224 may provide resource allocation, in one embodiment, for storing additional data in table submitted to database key-value service 210. For instance, control plane 220 may communicate with processing nodes to initiate the performance of various control plane operations, such as moves of multi-table partitions, splits of multi-table partitions, update tables, delete tables, create indexes, etc. In one embodiment, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation). Sub-table indexing, as discussed in detail below, may be included in the respective splits, copies, or other moves, in some embodiments.

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Because tables may be stored in multi-table partitions, resource allocation for a table to be created may be avoided as multi-partition tables may be updated to handle additional data according to storage node management 224 or other partition management features, in some embodiments. In some embodiments, similar techniques may be performed to create sub-tables (which may be performed without creating a new table) by table/sub-table creation/management 222.

In one embodiment, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in one embodiment. Item request processing 232 may perform various operations (e.g., read/get, write/update/modify/change, insert/add, or delete/remove) to access individual items stored in tables in database service 210, in one embodiment. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). Item request processing 232 may include processing for sub-tables, as discussed below with regard to FIG. 4.

In one embodiment, database service 210 may provide functionality for creating, accessing, and/or managing tables or secondary indexes at nodes within a multi-tenant environment. For example, database partitions 234 may store table item(s) 236 from multiple tables, indexes 238, or other data stored on behalf of different clients, applications, users, accounts or non-related entities, in some embodiments. Thus database partitions 234 may be multi-tenant, in some embodiments when storing items from different database tables. In some embodiments, an index 238 may include table items 236 (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. Moreover, different replica groups may utilize overlapping nodes, where a storage node 330 may be a member of multiple replica groups, maintaining replicas for each of those groups whose other storage node 330 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items 236 that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
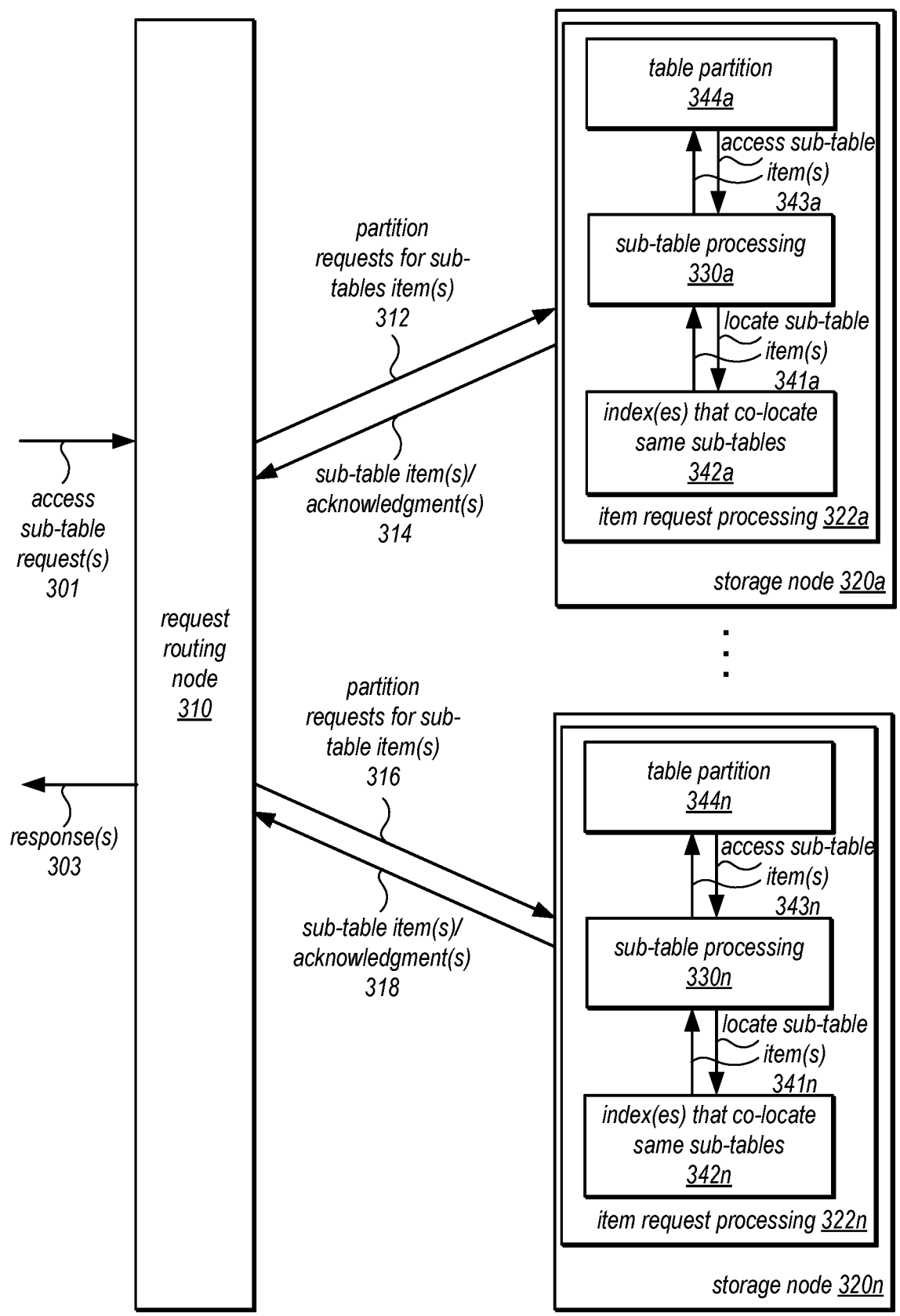
FIG. 3 is a logical block diagram illustrating requests for accessing a sub-table, according to some embodiments.

FIG. 3 is a logical block diagram illustrating requests for accessing a sub-table, according to some embodiments. As discussed below with regard to FIG. 6, access requests, such as access requests 301, for items of a sub-table may include various read, write, query, scan, get, update, or store requests, among others. Request routing node 310 may support these various requests through an interface, for instance, as noted above. Request routing node 310 may send requests to individual partitions that store the items in a sub-table. For example, partition requests for sub-table items, 312 and 316 may be sent to storage nodes 320a and 320n respectively. Sub-table processing 330a and 330n may search the index(es) (implemented as discussed below in either FIG. 5A or FIG. 5B) to locate sub-table items, as indicated at 341a and 341n. Then sub-table processing 330a and 330n may access the sub-table items as located, as indicated at 343a and 343n, in the respective table partitions 344a and 344n. A response, such as sub-table item(s) and/or acknowledgements of performed requests may be returned, as indicated at 314 and 318, in order to provide a response 303.

Figure 4:
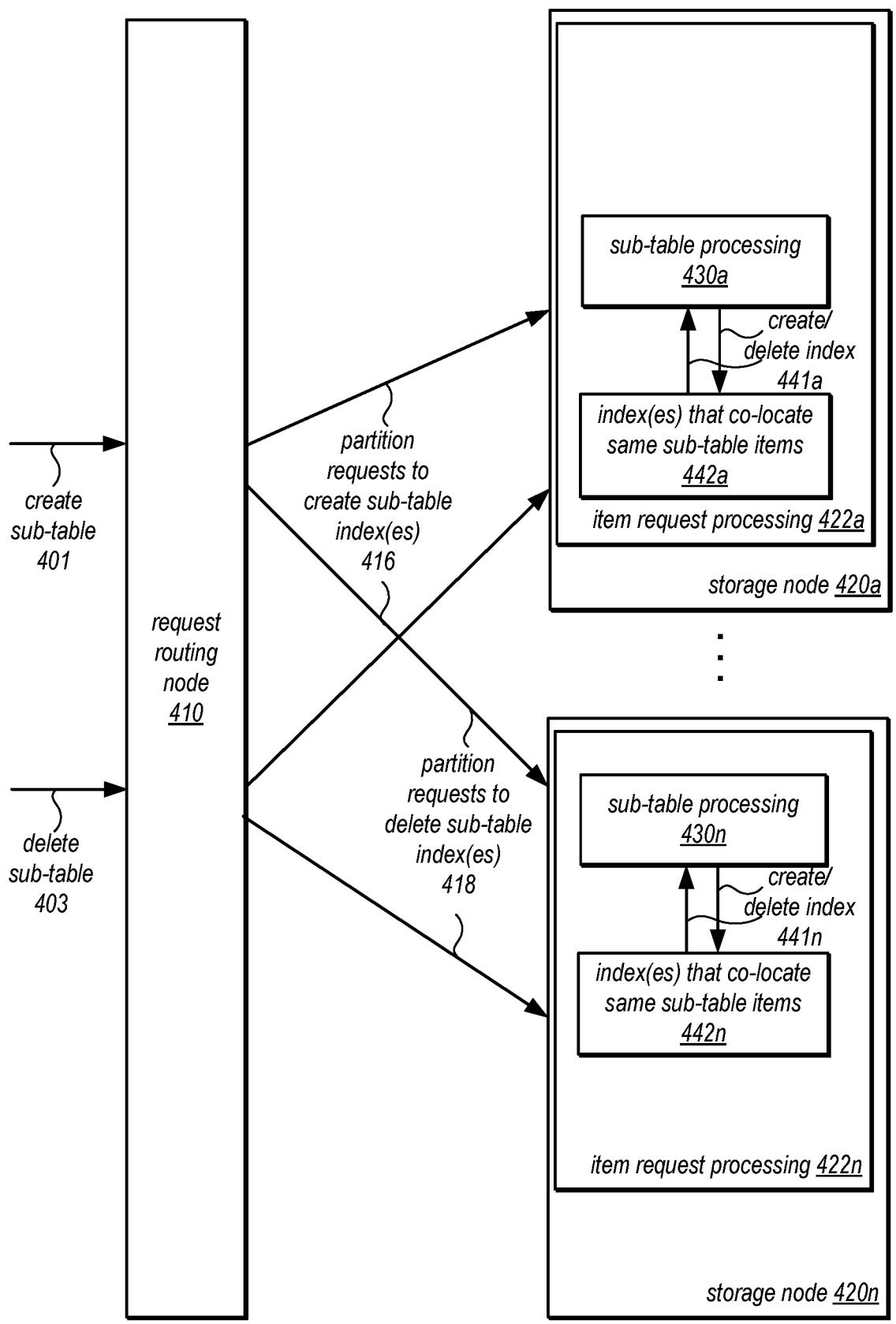
FIG. 4 is a logical block diagram illustrating requests for creating and deleting a sub-table, according to some embodiments.

FIG. 4 is a logical block diagram illustrating requests for creating and deleting a sub-table, according to some embodiments. Database service 210 may support requests via an interface (e.g., API, command line, protocol, query language, etc.) to create a sub-table, as indicated at 401, and delete a sub-table, as indicated 403. Delete request 403 may cause the items identified by an index for the sub-table to be deleted from the table without deleting items not identified as part of the sub-table, in various embodiments. A request routing node 410 may receive a request to create a sub-table and send instructions to create sub-table index(es) to individual partitions of a table, as indicated at 416, in those embodiments where separate sub-table indexes are maintained, as discussed below with regard to FIGS. 5A, 6 and 7. Sub-table processing, such as sub-table processing 430a and 430n implemented as part of item request processing, such as item request processing 422a and 422n, on a storage node, such as storage nodes 420a and 420n, may create the index, such as index 442a and 442n, as indicated at 441a and 441n. For example, indexes structured as discussed below with regard to FIGS. 5A, 6, and 7 may be created.

Creation requests may specify other features of a sub-table, in some embodiments. For example, a creation request 401 may specify a type of encryption to apply to the sub-table, a type of backup or replication feature for a sub-table, and/or specify an admission control for a sub-table (e.g., by user id, source of request, rate of requests, etc.), in various embodiments.

A delete sub-table request, as indicated at 403, may be received, in some embodiments. For example, a request routing node 410 may send requests to partitions to delete sub-table indexes as indicated 418. For separate sub-table indexes, as discussed below with regard to FIG. 5A, a data object or file that stores the specific index may be deleted. For sub-table index portions stored in a single index, various delete or other operations may be performed by sub-table processing 430 to delete the index, as indicated at 441. Accordingly, delete sub-table requests may be performed to delete items in the sub-table without deleting other items in a same table not in the same sub-table.

Figure 5A:
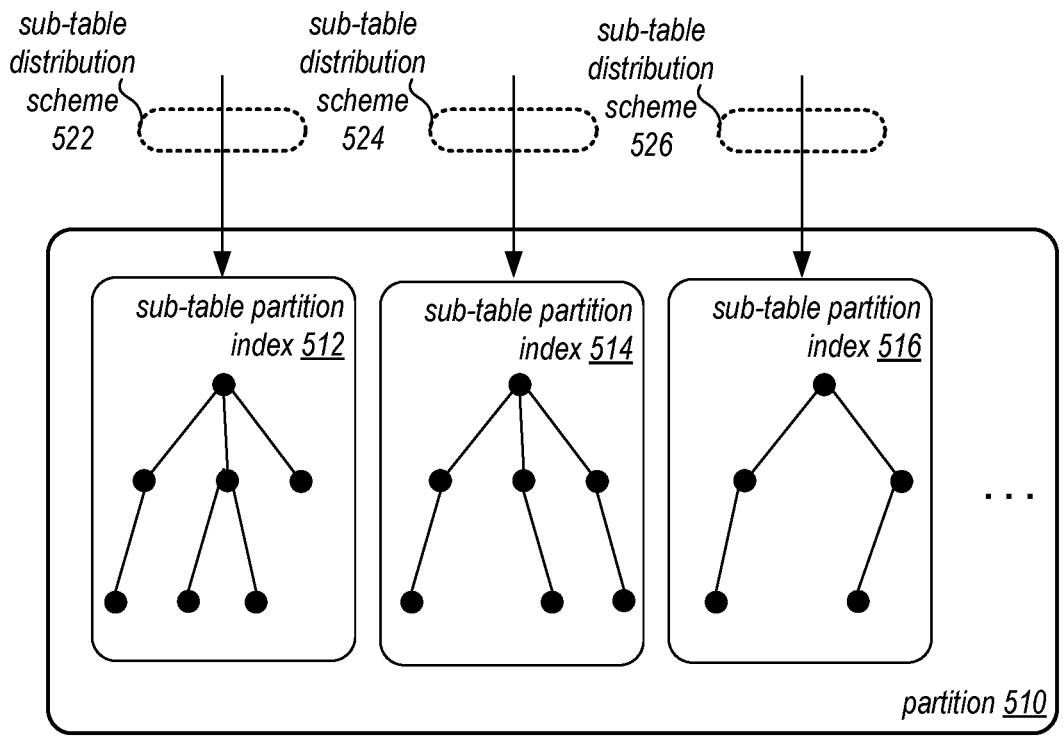
FIGS. 5A and 5B illustrate example indexing schemes for co-locating items of a sub-table, according to some embodiments.
Figure 5B:
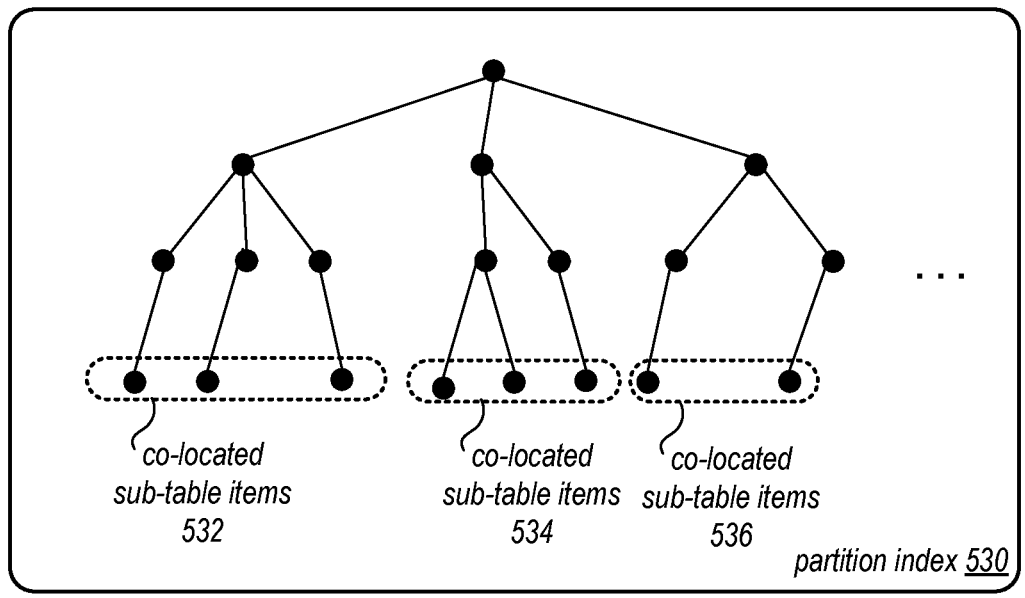

FIGS. 5A and 5B illustrate example indexing schemes for co-locating items of a sub-table, according to some embodiments. In FIG. 5A, separate indexes for those portions of a sub-table stored on a partition may be implemented, in some embodiments. For example, sub-table partition index 512 may be index created for items of a first sub-table stored as part of partition 510. Similarly, sub-table partition index 514 may be index created for items of a second sub-table stored as part of partition 510 and sub-table partition index 516 may be index created for items of a third sub-table stored as part of partition 510, and so on. The type of index structures for different sub-tables may be the same, in some embodiments. For instance, each sub-table partition index may be a B-tree type of index. In other embodiments, different types of indexes could be implemented for different sub-tables.

As illustrated in FIG. 5A, different distribution schemes, such as distribution schemes 522, 524, and 526 may be implemented for each sub-table. In this way, the sub-tables may be balanced across different partitions (instead of distributing items in the table without considering subtables which may distribute table items evenly but possibly allow for sub-tables that are more active than others for reading or writing to not be evenly distributed, resulting in an unbalanced utilization of resources across a database table). Thus, each distribution scheme 522, 524, and 526, could, for instance, send an item with the same value to different partitions according the distribution of items for that sub-table (and not the larger table that includes the sub-table).

Creating separate indexes for sub-tables may allow for various sub-table management features. For example, in some embodiments, a sub-table may be encrypted according to an encryption scheme specific to that sub-table (e.g., another sub-table in the same table may encrypted using a different encryption scheme). In this way, a client application that utilizes sub-tables for different tenants operating on or through the client application can specify or use the type of encryption for that sub-table, allowing for different sub-tables of the same database table to be encrypted differently.

Another management feature that uses separate indexes for sub-tables provides is allowing for an effectively unlimited number of sub-tables to be supported for a table, in some embodiments. Another management feature that using separate indexes for sub-tables provides is allowing secondary indexes to be created directly from identified sub-tables-instead of filtering out data from other sub-tables that would otherwise be stored together if separate indexes were not used, in some embodiments.

Another management feature that uses separate indexes for sub-tables provides is for various automated storage management features for a partition that stores a sub-table can be easily implemented. For example, metrics for workload or utilization of a storage node for a partition can be decorrelated from individual sub-tables using the distribution schemes to balance sub-tables. In this way, scaling techniques to, for instance, split a partition to increase capacity, can still be made based upon partition data (instead of individual sub-tables). For example, splits for storage and IOPS may be performed on the aggregate of all sub-tables in a partition into account for a split. Backup and restore operations can be performed on a sub-table basis, as backup settings for some sub-tables can be enabled while others can be disabled. In some embodiments, replication or change streams specific to a sub-table can be enabled or disabled. Similarly, an individual sub-table can be specified for a restore operation (e.g. to record changes for later replay or to replicate changes to another copy of the sub-table), in some embodiments. In some embodiments, utilization metrics to meter requests to a sub-table can be collected, allowing for responsibility allocations (e.g., to collect credits, payments, or other account from different entities associated with different sub-tables) to be performed. In another example, a time-to-live value for items to be retained in the table can be specified for the sub-table, which after expiration are deleted from the table.

FIG. 5B illustrates an example of a partition index 530 which may be used to co-locate items of a sub-table, in some embodiments. For example, a single index structure, such as a single B−tree, B+tree, other tree structure, or other indexing data structure more generally, may be implemented for a partition, such as partition index 530. The indexing scheme may be applied to insert or otherwise locate items (or pointers to items) in similar locations, such as co-located sub-table items 532, co-located sub-table items 534 and co-located sub-table items 536. For example, as discussed below with regard to FIG. 8, a sub-table identifier can be prepended to the output of a hash value generated for an item to be the indexing value, which may then be used to order and/or otherwise located sub-table items together according to the ordering/locating features of that index (e.g., locating the items of a same table as leaf nodes of the same ancestor which can be searched without visiting an item that is not in that sub-tree, such as a left to right scan of leaves in a tree).

A single partition index with co-located items of a sub-table can support many of the same management features discussed above for separate sub-table indexes, such as fast scans or queries for items within a sub-table, backup and restore operations specific to a sub-table, encryption specific to a sub-table, replication logs or streams that can be specific to a sub-table, among others.

Figure 6:
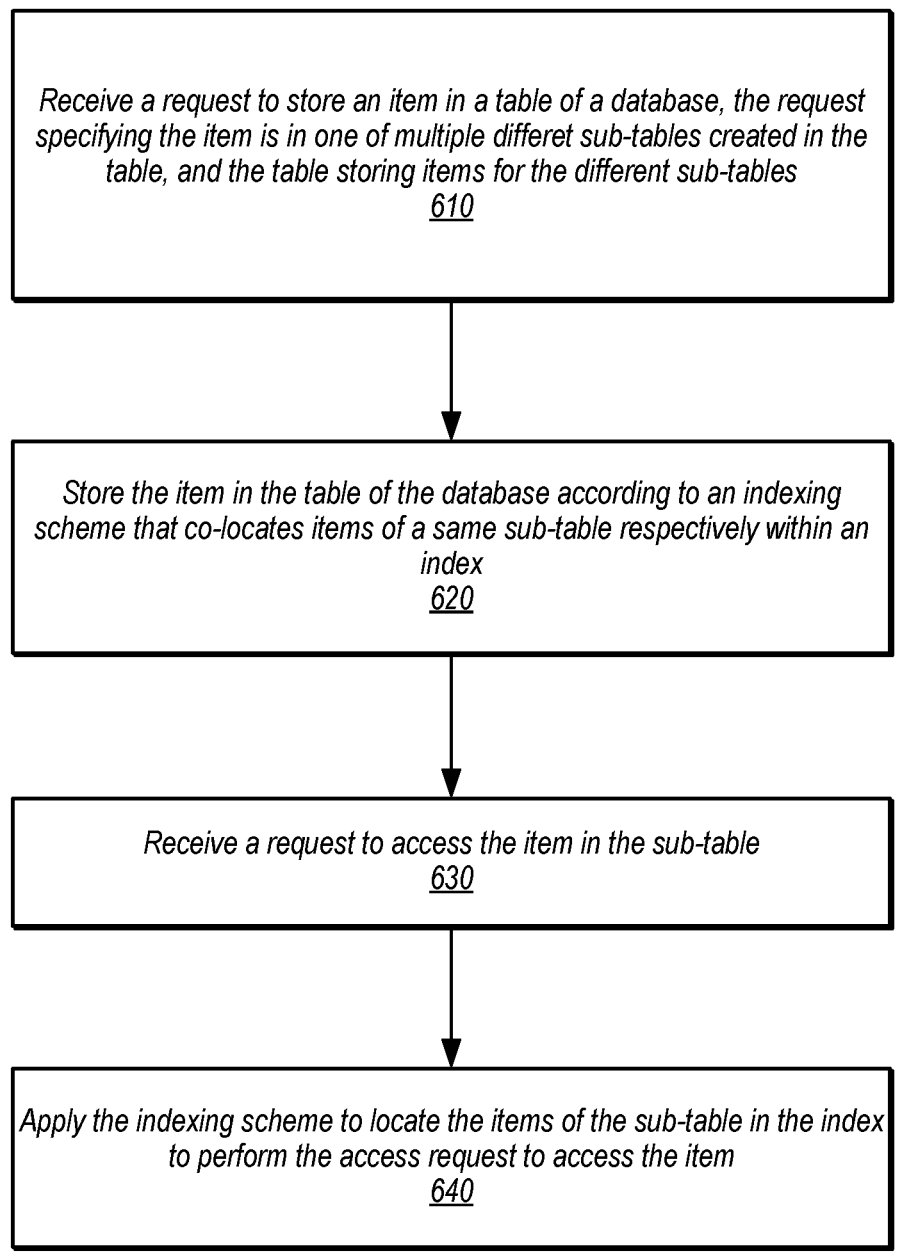
FIG. 6 is a high-level flowchart illustrating various methods and techniques to implement indexing sub-tables for performant access requests, according to some embodiments.

The examples of a database that implements sub-table indexing as discussed in FIGS. 2-5B above have been given in regard to a database service (e.g., a relational database, non-relational, or other type of database service). However, various other types of database systems that can advantageously implement sub-tables may implement indexing sub-tables for performant access, in other embodiments. FIG. 6 a high-level flowchart illustrating various methods and techniques to implement indexing sub-tables for performant access requests, according to some embodiments. These techniques, as well as the techniques discussed with regard to FIGS. 7-8, may be implemented using components or systems as described above with regard to FIGS. 2-5B, as well as other types of databases or storage systems, and thus the following discussion is not intended to be limiting as to the other types of systems that may implement the described techniques.

As indicated at 610, a request to store an item in a table of a database may be received, in various embodiments. For example, the request may be submitted via a programmatic interface (e.g., an API) for storing items, a network protocol or other connection to the database (e.g., JDBC or ODBC) and query language (e.g., SQL), ins some embodiments. The item may be a new item (e.g., an update table or insert item request), in some embodiments. In some embodiments, the request may be received as part of a data loading protocol or process (e.g., an Extract Transform Load (ETL)) that loads or stores many items into the database, or may be performed as part of a specialized load command supported by the database, such as an API that performs a batch upload of several items to the database.

The table may store different items for different sub-tables, in some embodiments. In various embodiments, the request may specify the item is one of the multiple different sub-tables created in the table. For example, the request may identify the sub-table by a sub-table name or other sub-table identifier. In some embodiments, the request may be associated with a client identifier, user identifier, or other identifier that may be mapped to the sub-table.

As indicated at 620, the item may be stored in the table of the database according to an indexing scheme that co-locates items of a same sub-table respectively within an index, in various embodiments. For example, different types of database index structures may be implemented that can store items (or pointers or other item locators for the items), such as tree structures (e.g., B-trees or B+ trees) or arrays (e.g., hash arrays). As discussed in detail below with regard to FIGS. 7 and 8, different numbers or arrangements of index structures may be used to store sub-table items.

As indicated at 630, a request to access the item in the sub-table may be received, in some embodiments. For example, the request may be a request to retrieve the specific item (e.g., a singleton read, get, or fetch that identifies the item as the item to return). In other embodiments, the request to access the item may be a query, scan, search, or other request that returns or otherwise accesses multiple items including the specified item. In some embodiments, an access request may be a request to modify the item (e.g., add, remove, or change attributes or attribute values, change field/column values, etc.). In some embodiments, the access request may be a request to delete the item.

As indicated at 640, the indexing scheme may be applied to locate the items of the sub-table in the index to perform the access request to access the item, in some embodiments. For example, if, as discussed below with regard to FIG. 7, the indexing scheme uses separately created indexes for sub-tables, then an index value of the item for the specific sub-table may be created (e.g., a hash value) and used to search for the item (e.g., search a tree index for the item's corresponding node). In another example, as discussed below with regard to FIG. 8, indexing utilizes a common index for multiple sub-tables, then index value generation according to the indexing scheme may be applied to generate the index value (or multiple index values, such as a range of index values) based on the sub-table.

A result or response to the request may be returned, in some embodiments. For example, the item (or portions thereof) may be returned as part of a query or get request. In another example, an acknowledgement that an update or delete was performed may be sent in response.

Figure 7:
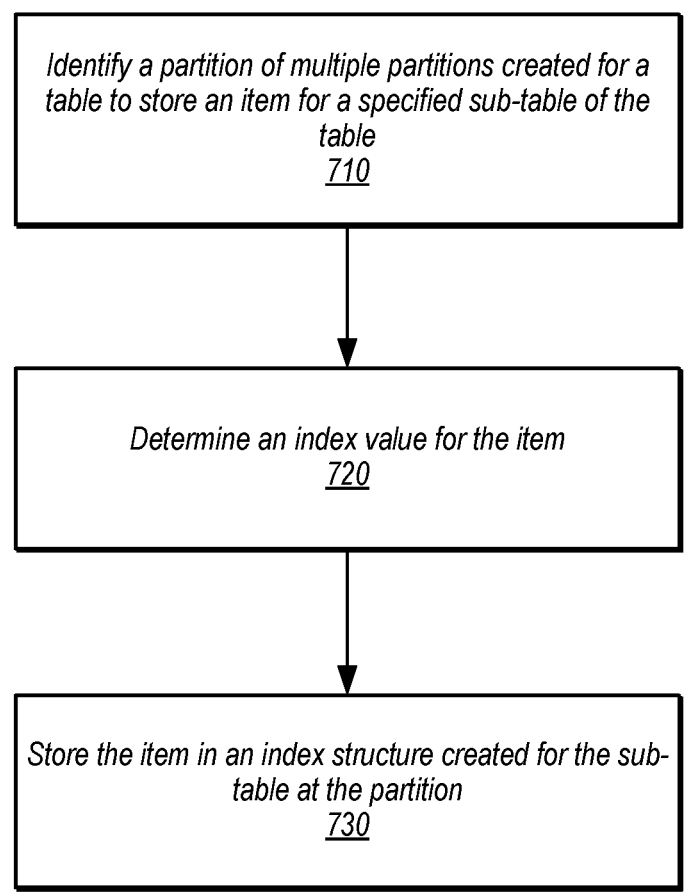
FIG. 7 is a high-level flowchart illustrating various methods and techniques to store items to an index structure created for a sub-table in a table partition, according to some embodiments.

As discussed above with regard to FIG. 5A, sub-table specific indexes may be created and maintained in some embodiments to co-locate sub-table items in an index for a database, in some embodiments. FIG. 7 is a high-level flowchart illustrating various methods and techniques to store items to an index structure created for a sub-table in a table partition, according to some embodiments. As indicated at 710, a partition of a multiple partitions created for a table to store an item for a specified sub-table of the table may be identified, in some embodiments. For example, a distribution scheme may be used to map items in a table to one of the table's partitions. A hash-based distribution scheme may be used, in some embodiments, to generate hash values. In some embodiments, other distribution schemes may be used (e.g., based on a selected partitioning key, such as distributing different ranges of partitioning key values like A to D to partition 1, E to L to partition 2, and so on). In at least some embodiments, the distribution scheme applied may correspond to the specified sub-table. For example, if the specified sub-table is "sub-table A" then a hash function for "sub-table A" may be applied. A different hash table (or other distribution scheme) may be applied for another sub-table (e.g., a different hash function for "sub-table B"). In some embodiments, the hash function may be the same, but a sub-table identifier or other "salt" for the hash function may differ between sub-tables. For instance, the same partition key value "foo" for different sub-tables may be mapped to different partitions using the same hash function, as a different value may be used to modify the key value before applying the hash function.

As indicated at 720, an index value may be determined for the item, in some embodiments. For example, the index value may be the same or different than a value generated to identify the partition as part of the distributions scheme (e.g., by applying a hash function). In some embodiments, the partition key value specified for the table may be used to generate (or be used as) the index value. As indicated at 730, the item may be stored in the index structure created for the sub-table at the partition, in some embodiments. For example, if the index is a tree structure, like a B-tree, then a new leaf node may be created to store a pointer to the item (or in a B+ tree the item itself).

Figure 8:
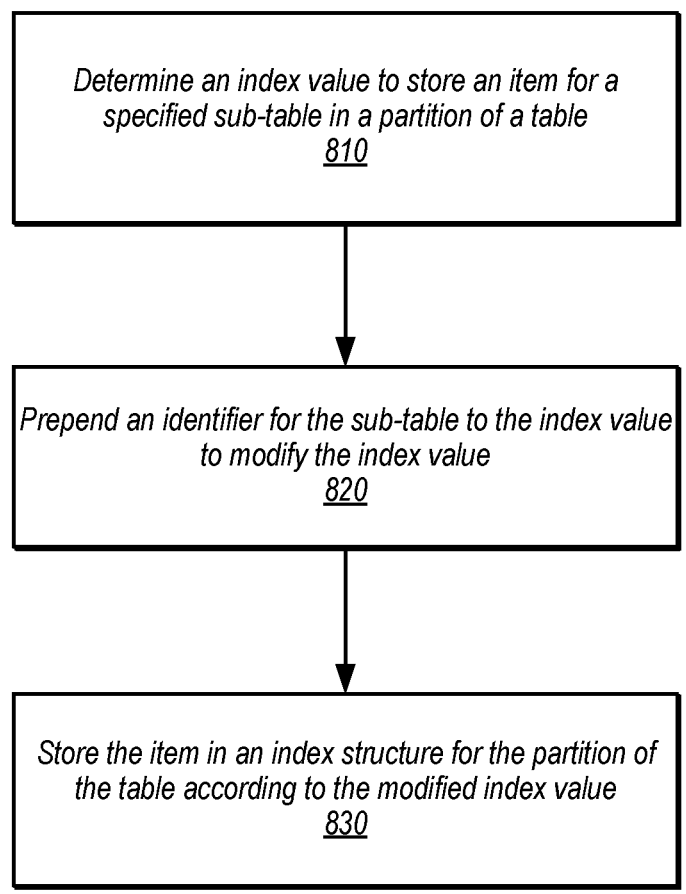
FIG. 8 is a high-level flowchart illustrating various methods and techniques to store items to an index structure for a table partition that co-locates items for the sub-table within the index structure, according to some embodiments.

As discussed above with regard to FIG. 5B, a single partition index may be created and maintained in some embodiments to co-locate sub-table items in an index for a database, in some embodiments. FIG. 8 is a high-level flowchart illustrating various methods and techniques to store items to an index structure for a table partition that co-locates items for the sub-table within the index structure, according to some embodiments. As indicated at 810, an index value may be determined to store an item for a specified sub-table in a partition of a table, in some embodiments. For example, an index value may be a selected partition key, sort key, or other attribute, field, or column of a table that can be used to index items in a partition of a table. In some embodiments, determining an index value may include applying a hash function to use the output hash value as the index value.

As indicated at 820, an identifier for the sub-table may be prepended to the index value to modify the index value, in some embodiments. For example, if a table identifier is "2099" and an index value is "1930295" then the modified index value may be "20991930295". In this way, another sub-table with a same value will be stored in a location based on that other prepended value and not in the same location as the sub-table. As indicated at 830, the item may be stored in the index structure for the partition of the table according to the modified index value, in some embodiments. For example, if the index is a tree structure, like a B-tree, then a new leaf node may be created to store a pointer to the item (or in a B+ tree the item itself).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
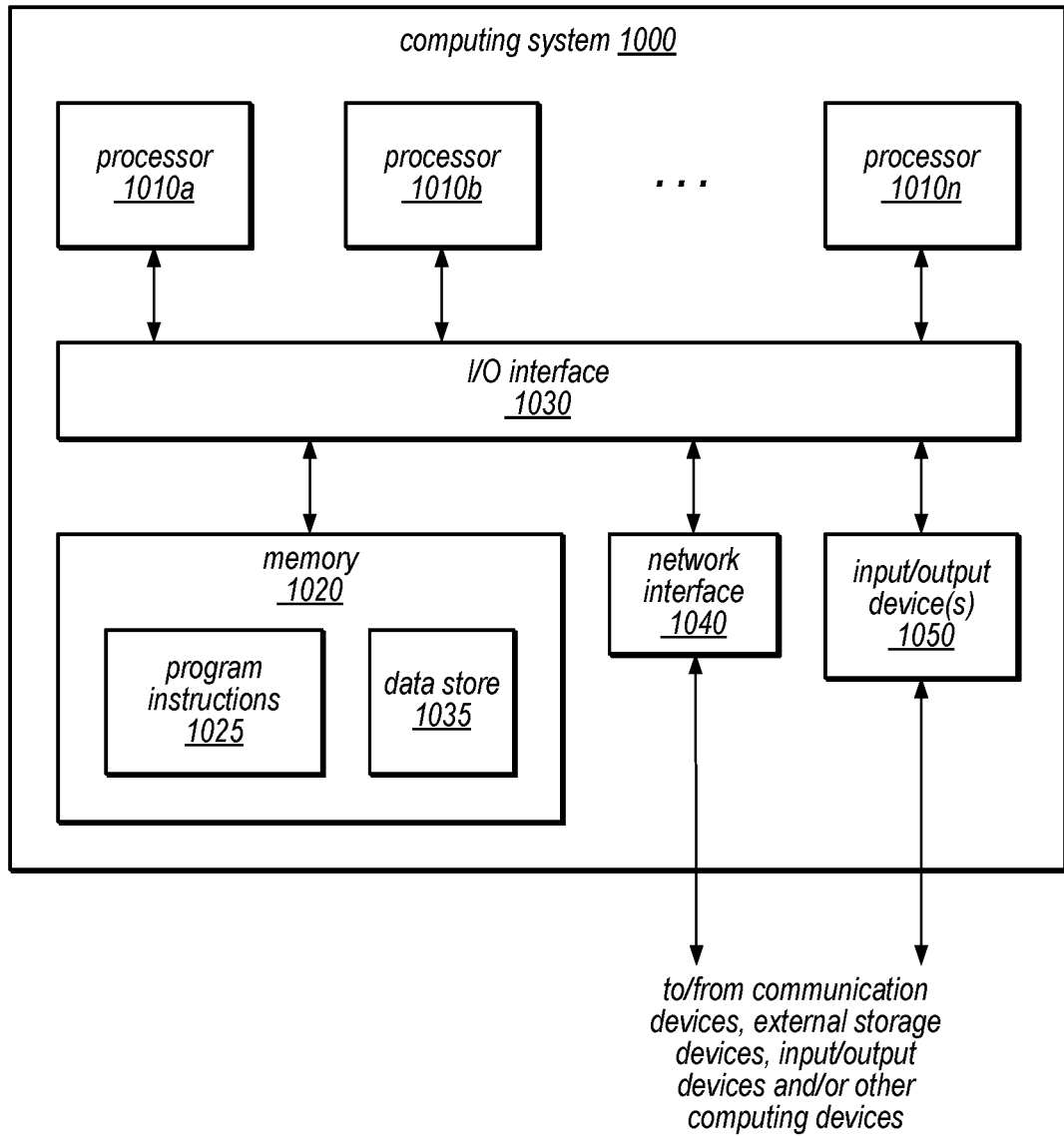
FIG. 9 is a block diagram illustrating an example computing system, according to some embodiments.

Embodiments to implement indexing sub-tables for performant access requests as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor;
   a memory, storing program instructions that when executed by the at least one processor cause the at least one processor to implement a database system that stores a database;
   wherein the database stores a table, wherein the table comprises a plurality of different sub-tables respectively created in the table responsive to one or more requests to create the plurality of different sub-tables, wherein the table is logically divided into the plurality of different sub-tables according to respective identifiers for the plurality of different sub-tables, wherein the plurality of different sub-tables includes sub-tables comprising respective pluralities of items, wherein the respective pluralities of items are distributed across more than one of a plurality of partitions that store the table according to different, respective distribution schemes corresponding to individual ones of the sub-tables that are used to select which ones of the plurality of partitions to store different ones of the respective pluralities of items when the different ones of the respective plurality of items are received in respective requests that identify respective ones of the plurality of different sub-tables to store the different ones of the respective plurality of items, wherein the different, respective distribution schemes are respectively determined for the plurality of different sub-tables as part of performing the one or more requests to create the plurality of different sub-tables, and wherein the different, respective distribution schemes balance the respective pluralities of items of individual ones of the sub-tables across the plurality of partitions such that a first item of two items included in two different ones of the sub-tables with a same value is stored in a first partition according to a first one of the different, respective distributions schemes corresponding to a first one of the two different ones of the sub-tables and such that a second item of the two items included in the two different ones of the sub-tables with the same value is stored in a second partition according to a second one of the different, respective distribution schemes corresponding to a second one of the two different ones of the sub-tables;
   wherein the database system is configured to:
      receive a request to store an item in a table of the database, wherein the request identifies one of a plurality of different sub-tables, and wherein the request specifies that the item is to be in the one sub-table;
      update an index as part of storing the item in the table of the database according to an indexing scheme that co-locates items of the one of the plurality of different sub-tables respectively within the index;
      receive a request to access the item that specifies the one of the plurality of different sub-tables; and
      search the updated index that co-locates items of the specified sub-table to locate and perform the request to access the item.

2. The system of claim 1, wherein the database system is further configured to:

receive a request to create the one of the plurality of different sub-tables in the database; and create separate index structures for the one of the plurality of different sub-tables at the plurality of partitions for the table in the database.

3. The system of claim 2, wherein to update an index as part of storing the item, the database system is configured to:

identify one of the plurality of partitions for the table to store the item according to a respective distribution scheme for the one of the plurality of different sub-tables;

determine an index value for the item; and store the item in the index structure created for the one of the plurality of different sub-tables at the identified partition.

4. The system of claim 1, wherein to update the index as part of storing the item, the database system is configured to:

determine an index value to store the item at an identified partition of the plurality of partitions of the table;

prepend the identifier for the one of the plurality of different sub-tables to the index value to modify the index value; and store the item in an index structure for the identified partition of the table according to the modified index value, wherein the index structure for the identified partition stores another item for another one of the plurality of different sub-tables.

5. A method, comprising:

implementing, at a database system, a database that stores a table, wherein the table comprises a plurality of different sub-tables respectively created in the table responsive to one or more requests to create the plurality of different sub-tables, wherein the table is logically divided into the plurality of different sub-tables according to respective identifiers for the plurality of different sub-tables, wherein the plurality of different sub-tables includes sub-tables comprising respective pluralities of items, and wherein the respective pluralities of items are distributed across more than one of a plurality of partitions that store the table according to different, respective distribution schemes corresponding to individual ones of the sub-tables that are used to select which ones of the plurality of partitions to store different ones of the respective pluralities of items when the different ones of the respective plurality of items are received in respective requests that identify respective ones of the plurality of different sub-tables to store the different ones of the respective plurality of items, wherein the different, respective distribution schemes are respectively determined for the plurality of different sub-tables as part of performing the one or more requests to create the plurality of different sub-tables, and wherein the different, respective distribution schemes balance the respective pluralities of items of individual ones of the sub-tables across the plurality of partitions such that a first item of two items included in two different ones of the sub-tables with a same value is stored in a first partition according to a first one of the different, respective distributions schemes corresponding to a first one of the two different ones of the sub-tables and such that a second item of the two items included in the two different ones of the sub-tables with the same value is stored in a second partition according to a second one of the different, respective distribution schemes corresponding to a second one of the two different ones of the sub-tables;

receiving, at the database system, a request to store an item in the table, wherein the request identifies one of the plurality of different sub-tables, wherein the request specifies that the item is to be in the one sub-table;

storing, by the database system, the item in the table of the database according to an indexing scheme that co-locates items of the one of the plurality of different sub-tables respectively within an index; and responsive to a request to access the item, applying, by the database system, the indexing scheme to locate the item of the one of the plurality of different sub-tables in the index to perform the request to access the item.

6. The method of claim 5, wherein the storing the item in the table of the database according to the indexing scheme that co-locates items of the one of the plurality of different sub-tables respectively within the index comprises:

determining an index value to store the item at an identified partition of the plurality of partitions of the table;

prepending the identifier for the one of the plurality of different sub-tables to the index value to modify the index value; and storing the item in an index structure for the identified partition of the table according to the modified index value, wherein the index structure for the identified partition stores another item for another one of the plurality of different sub-tables.

7. The method of claim 5, further comprising:

responsive to receiving a request to delete the one of the plurality of different sub-tables, deleting, by the database system, items identified as part of the one of the plurality of different sub-tables according to the index from the table without deleting items not identified as part of the one of the plurality of different sub-tables from the table.

8. The method of claim 5, wherein storing the item in the index structure of the table according to the modified index value, comprises storing the item according to an encryption technique specified for the one of the plurality of different sub-tables.

9. The method of claim 5, further comprising:

restoring, by the database system, the one of the plurality of different sub-tables from a backup of the one of the plurality of different sub-tables into the table of the database responsive to a request to restore the one of the plurality of different sub-tables.

10. The method of claim 5, wherein performing the request to access the item comprises applying an admission control specified for the one of the plurality of different sub-tables to determine that the access request to the item can be performed.

11. The method of claim 5, further comprising:

receiving, at the database system, a request to create the one of the plurality of different sub-tables in the database; and creating, by the database system, separate index structures for the one of the plurality of different sub-tables at the plurality of partitions for the table in the database.

12. The method of claim 11, wherein the storing the item in the table of the database according to the indexing scheme that co-locates items of the one of the plurality of different sub-tables respectively within the index comprises:

identifying one of the plurality of partitions for the table to store the item according to a respective distribution scheme for the one of the plurality of different sub-tables;

determining an index value for the item; and storing the item in the index structure created for the one of the plurality of different sub-tables at the identified partition.

13. The method of claim 5, wherein the database system is implemented as part of a database service of a provider network and wherein the one of the plurality of different sub-tables is created in response to a request to create the one of the plurality of different sub-tables received via an interface for the database service.

14. One or more non-transitory, computer-readable storage media, storing program instructions that when executed on or across one or more computing devices cause the one or more computing devices to implement a database system that implements:
    causing a database to store a table, wherein the table comprises a plurality of different sub-tables respectively created in the table responsive to one or more requests to create the plurality of different sub-tables, wherein the table is logically divided into the plurality of different sub-tables according to respective identifiers for the plurality of different sub-tables, wherein the plurality of different sub-tables includes sub-tables comprising respective pluralities of items, and wherein the respective pluralities of items are distributed across more than one of a plurality of partitions that store the table according to different, respective distribution schemes corresponding to individual ones of the sub-tables that are used to select which ones of the plurality of partitions to store different ones of the respective pluralities of items when the different ones of the respective plurality of items are received in respective requests that identify respective ones of the plurality of different sub-tables to store the different ones of the respective plurality of items, wherein the different, respective distribution schemes are respectively determined for the plurality of different sub-tables as part of performing the one or more requests to create the plurality of different sub-tables, and wherein the different, respective distribution schemes balance the respective pluralities of items of individual ones of the sub-tables across the plurality of partitions such that a first item of two items included in two different ones of the sub-tables with a same value is stored in a first partition according to a first one of the different, respective distributions schemes corresponding to a first one of the two different ones of the sub-tables and such that a second item of the two items included in the two different ones of the sub-tables with the same value is stored in a second partition according to a second one of the different, respective distribution schemes corresponding to a second one of the two different ones of the sub-tables;
    receiving a request to store an item in the table, wherein the request identifies one of the plurality of different sub-tables, wherein the request specifies that the item is to be in the one sub-table;
    updating an index as part of storing the item in the table of the database according to an indexing scheme that co-locates items of the one of the plurality of different sub-tables respectively within the index;
    receiving a request to access the item; and
    applying the indexing scheme to locate the item of the one of the plurality of different sub-tables in the index to perform the request to access the item.

15. The one or more non-transitory, computer-readable storage media of claim 14, storing further instructions that when executed on or across the one or more computing devices cause the database system to further implement:
    receiving a request to create the one of the plurality of different sub-tables in the database; and
    creating separate index structures for the one of the plurality of different sub-tables at the plurality of partitions for the table in the database.

16. The one or more non-transitory, computer-readable storage media of claim 14, wherein, in updating the index as part of storing the item in the table of the database, the program instructions cause the database system to implement:
    identifying one of the plurality of partitions for the table to store the item according to a respective distribution scheme for the one of the plurality of different sub-tables;
    determining an index value for the item; and
    storing the item in an index structure created for the one of the plurality of different sub-tables at the identified partition.

17. The one or more non-transitory, computer-readable storage media of claim 14, wherein a time-to-live is specified for the one of the plurality of different sub-tables and wherein the one or more non-transitory, computer-readable storage media store further instructions that when executed on or across the one or more computing devices cause the database system to further implement:
    deleting items identified as part of the one of the plurality of different sub-tables according to the index after expiration of the specified time-to-live.

18. The one or more non-transitory, computer-readable storage media of claim 14, wherein backup is enabled for the one of the plurality of different sub-tables and wherein the one or more non-transitory, computer-readable storage media store further instructions that when executed on or across the one or more computing devices cause the database system to further implement:
    performing a backup operation for the table on the different sub-tables, including the one sub-table with backup enabled.

19. The one or more non-transitory, computer-readable storage media of claim 14, storing further instructions that when executed on or across the one or more computing devices cause the database system to further implement:
    responsive to receiving a request to delete the one of the plurality of different sub-tables, deleting items identified as part of the one of the plurality of different sub-tables according to the index from the table without deleting items not identified as part of the one of the plurality of different sub-tables from the table.

20. The one or more non-transitory, computer-readable storage media of claim 14, wherein, in updating the index as part of storing the item in the table of the database, the program instructions cause the database system to implement:
    determining an index value to store the item at an identified partition of the plurality of partitions of the table;
    prepending the identifier for the one of the plurality of different sub-tables to the index value to modify the index value; and
    storing the item in an index structure for the identified partition of the table according to the modified index value, wherein the index structure for the identified partition stores another item for another one of the plurality of different sub-tables.

* * * * *